United States Patent [19]
Warner et al.

[11] Patent Number: 5,660,742
[45] Date of Patent: Aug. 26, 1997

[54] INSULATED WIRE TERMINATION, METHOD, AND MACHINE

[75] Inventors: Allan S. Warner, Clark; Edward D. Riordan, Somerville, both of N.J.

[73] Assignee: Joyal Products, Inc., Linden, N.J.

[21] Appl. No.: 416,021

[22] Filed: Mar. 31, 1995

[51] Int. Cl.$^6$ .................................................. B23K 31/02
[52] U.S. Cl. ...................... 219/85.16; 219/243; 228/228; 228/44.7
[58] Field of Search .......................... 219/50, 85.1, 85.16, 219/243; 174/74 R; 228/44.3–44.7, 51, 212, 228

[56] References Cited

U.S. PATENT DOCUMENTS

| | | | |
|---|---|---|---|
| 2,250,156 | 7/1941 | Ferguson | 219/10 |
| 2,432,463 | 12/1947 | Watson | 219/243 |
| 3,421,212 | 1/1969 | Chabot | 29/628 |
| 3,519,778 | 7/1970 | Gibson, Jr. | 219/58 |
| 3,523,173 | 8/1970 | Lull | 219/91 |
| 3,781,981 | 1/1974 | Miura et al. | 29/597 |
| 3,946,145 | 3/1976 | Warner | 174/94 |
| 4,032,057 | 6/1977 | Bennett et al. | 29/860 |
| 4,034,152 | 7/1977 | Warner | 174/94 |
| 4,317,277 | 3/1982 | Faber et al. | 219/243 |
| 4,408,558 | 10/1983 | Faber et al. | 118/59 |
| 4,538,045 | 8/1985 | Slavin et al. | 219/91.21 |
| 4,541,559 | 9/1985 | O'Brien | 228/117 |
| 4,571,019 | 2/1986 | Arai | 339/276 |
| 4,687,900 | 8/1987 | Warner | 219/111 |
| 4,954,689 | 9/1990 | Smith | 219/125.1 |
| 5,057,661 | 10/1991 | Banner | 219/56.22 |
| 5,063,279 | 11/1991 | Rossi | 219/86.51 |
| 5,109,147 | 4/1992 | Erlach | 219/85.16 |
| 5,111,015 | 5/1992 | Riordan | 219/56.22 |
| 5,178,315 | 1/1993 | Konno et al. | 228/212 |
| 5,264,674 | 11/1993 | Mangan et al. | 219/56.22 |
| 5,286,945 | 2/1994 | Abe | 219/85.16 |
| 5,300,753 | 4/1994 | Rossi | 219/110 |

OTHER PUBLICATIONS

S. Karpel, Joining Copper Conductors Using Tin–Fusing, Quarterly Journal, No. 145, 1985, (two page reprint), Int. Tin Research Institute, Middlesex, England.

Allan Warner, SN–FUSING, Proceedings Coil Winding 1984, pp. 175–184, International Coil Winding Association, Inc.

Schweisszangen Fur Industrielle Fertigung, three page brochure by Aro Machines A Souder, "Program 1972".

Primary Examiner—Teresa J. Walberg
Assistant Examiner—Raphael Valencia
Attorney, Agent, or Firm—Edward Dreyfus, Esq.

[57] ABSTRACT

A method, machine and termination for connecting two or more insulated wire ends includes placing them in a metal tube held between fusing electrodes. The electrodes are shaped to deform the tube and wires therein with the application of fusing pressure. During fusing, pressure builds first to press the assembly together, then heat and current are applied as the tube and internal wires are compressed. Fusing current first flows from a longitudinal region of the tube equally in both direction through the tube metal to soften the tube and distribute the fusing heat broadly. As the wire insulation is burned off or flows away, current also passes through the bare wire ends to aid the fusing process. For tinned copper tubes, some of the inside tin layer flows to wet copper surfaces and dissolve copper impurities. Some tin flows to seal small spaces between the fused wires. Some of the tin on the outside surface and inside surface of the tube may vaporize. A fusing machine for carrying out the method is suspended from a standard retractable winch cable so that the electrodes can be easily positioned in free space.

11 Claims, 8 Drawing Sheets

INSULATED WIRE TERMINATION, METHOD, AND MACHINE

BACKGROUND

The present invention relates generally to fused wire terminations and more particularly to terminations in which a plurality of individually insulated wires or individually insulated wires of a stranded cable are fused within a tube-like terminal or device. The present invention also relates to the method of making such termination and the apparatus for making such termination.

Many attempts have been made to design methods and apparatus for quickly and reliably terminating a plurality of individually insulated wires to a terminal or other device. One standard technique today requires the insulation at the ends of stranded magnet wire, for example, to be manually or chemically stripped of insulation then placed in a partial ring-like device or terminal and crimped to a closed and compressed configuration.

A standard technique for terminating insulated transformer wire includes inserting them into a tube member that has a brazed longitudinal seam that serves to only hold the tube shape before compression. The tube has ridges or projections on its inner surface. The assembly is cold crimped causing the ridges to penetrate the wire insulation to make electrical contact with the outer surfaces of the wires therein.

These standard methods are not only time and labor consuming, but produce irregular or mechanically weak terminations which causes hot spots when the cable carries or the wires carry electrical power.

Methods of fusing an insulated wire to a terminal or other metal device are also known where the insulation is driven or burned away during the fusing process. See for example, U.S. Pat. Nos.: Riordan 5,111,015; Gibson, Jr. 3,519,778; Szantho et al 4,371,772.

Methods are also known for placing a number of wires in terminal or other device and fusing the assembly under heat and pressure to burn away or vaporize the insulation and fuse the parts together. See U.S. Pat. Nos. A. S. Warner 4,034,152 and Slavin et al 4,538,045.

A disclosure is also known purporting to include wrapping a metal wire mesh around three individually insulated rectangular conductors and inserting the assembly into a ring terminal and welding the assembly to burn off the insulation and enhance the electrical contact of the final product by the use of the wire mesh. See U.S. Pat. No. 4,317,277.

Hand-held welding machines are also known that suspend from retracting winch mounted cables for movement in free space by an operator in order to be able to move the machine quickly from one welding location to another and to quickly change the welding head orientation. See ARO brand Spot Welding Guns Models N297A and B, ARO Machines A Souder, Chilly-Mazarin, France.

Notwithstanding prior methods and arrangements and apparatus, the need for faster and more reliable methods and equipment for making such terminations continues to grow. Some of the problems with prior systems include excessive manual and time consuming efforts, the inability of maintaining a proper fusing or welding head orientation manually just prior to fusing power application, inability to develop a reliable, reproducible, and uniform electrical connection among the fused and compressed assembly of parts, the need to introduce an element or filler material between the individual wires in order to adequately burn off insulation, the inability to fuse magnet wire cables without producing substantially low production yields, and the need to use chemicals or manual insulation stripping equipment and steps.

SUMMARY OF EXEMPLARY EMBODIMENT OF THE PRESENT INVENTION

It is an object of the present invention to provide a method, fusing machine and final termination that solve the foregoing problems and provide advantages and benefits beyond the capability of the prior art.

One exemplary method, according to the principles of the present invention, includes inserting individually insulated wire ends into a metal tube, then applying mechanical pressure with the fusing electrodes to compress the assembly transverse to its axis.

As deformation and pressure build, current is applied through the electrodes and equally through two paths in the tube to heat the tube and wires therein to burn off the insulation and/or cause the insulation to flow to any open spaces in the joint. Because two current paths are provided by the tube, the system can apply greater power to the joint and the tube walls can be thinner than the case where only one current path is provided.

The electrode continues to apply pressure up to a predetermined limit as the parts heat toward their plastic state to compress and fuse the now uninsulated wires with each other and with the deformed tube to form strong mechanical and electrical bonds among the parts.

Another aspect of the invention is to provide a method for producing a good quality and reliable electrical termination of the type described. One example of the method according to the present invention uses a tin plated or coated copper tube. Accordingly, the tin performs many functions during the fusing process, such as wetting and cleaning the copper material prior to fusing temperatures being reached, flowing to fill any open spaces to enhance joint sealing near the tube inner surface, functioning as a copper solvent to form bronze in the event any high temperature zones result from the application of fusing current, and other benefits.

The wires can be of any suitable type such as magnet wire, Litz wire, insulated and uninsulated stranded cable or the like.

Production reliability is enhanced, in accordance with the present invention, by including the step of having the electrodes lightly but securely engaging the tube prior to the fusing process described above. The electrodes thus assume a "ready position" prior to initiation of fusing. This enables the operator to secure the tube between the electrodes, insert the insulated wires, check for proper positioning of all parts prior to initiation of the fusing process. If parts are not properly positioned, the operator can, if desired, release the electrode from the ready position, re-position the tube and again move the electrodes to the ready position and reposition the wires or cable. If the parts are now properly positioned, then the operator can initiate the high pressure, high energy fusing process.

In one example according to the principles of the present invention, the machine can be stationary whereby the tube and wires or cable are brought to the electrode fusing position.

Another arrangement affords great advantages for production, where the wire ends are generally positioned differently in space, such as a plurality of stator wires of a large motor. The present fusing machine can be suspended from a retracting winch mounted cable to move freely in space, thereby enabling the operator or a robot to properly position the fusing electrodes in free space. With the tube held in the ready position, wires are inserted and the machine activated to fuse the assembly. Now, however, the operator can relatively quickly, bring the machine to the ready position, fuse a termination, sequentially, move the machine to the next wire set in space in turn to repeat the process.

One example of the machine according to the principles of the present invention includes a frame and a pair of electrodes aligned for relative movement in a direction generally perpendicular to the axis of the tube to be held therebetween. A pair of handles mounted on the frame, one on either side of the electrodes. A ready switch is mounted on one handle. But in order to apply fusing power, the operator must actuate two switches, one on each handle. Thus, both hands must be on both handles, away from the electrodes, when power is applied.

Another aspect of the invention includes a termination or terminal assembly made by one or more of the method aspects described above.

Other and further advantages and benefits provided by the present invention will become apparent with the following detailed description when taken in view of the appended drawings of one exemplary embodiment of the invention, in which:

DESCRIPTION OF EXEMPLARY EMBODIMENTS OF PRESENT INVENTION

Figure 1:
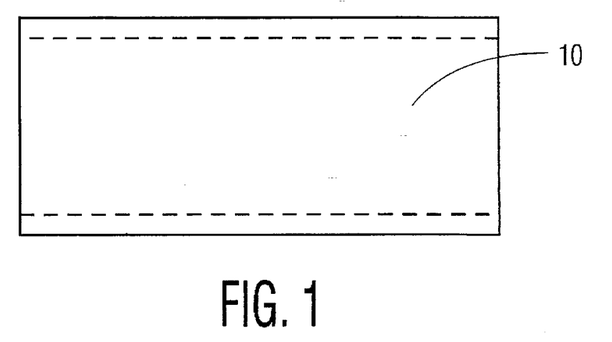
FIG. 1 is a side view of one example of a tube termination used in the present invention.
Figure 2:
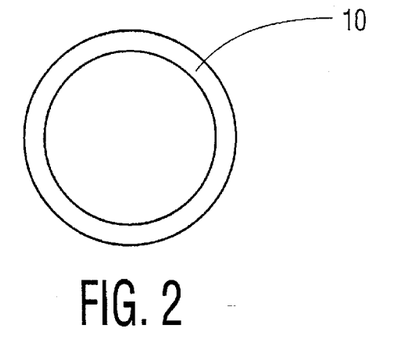
FIG. 2 is a front view of the tube of FIG. 1.

With reference to FIGS. 1 and 2, the present invention includes the use of a terminal tube 10 made of suitable metal such as copper or bronze or steel depending upon the application and specific wire materials to be terminated. In a preferred embodiment, tube 10 comprises a tin-plated cylindrical tube which is easily manufactured and simply cut and tinned in tubular form. Alternatively, tube 10 can be made from rolled sheet metal with a soldered, welded seam, or otherwise joined seam (not shown). A preferred feature is that tube 10 should be electrically continuous such that current and heat will flow evenly through both half-cylinders of tube 10 in a manner described below. It is also preferred that the tube 10 shape be cylindrical so that the operator or the mechanical placement apparatus need not be concerned with the angular orientation of tube 10 in the electrode.

Figure 3:
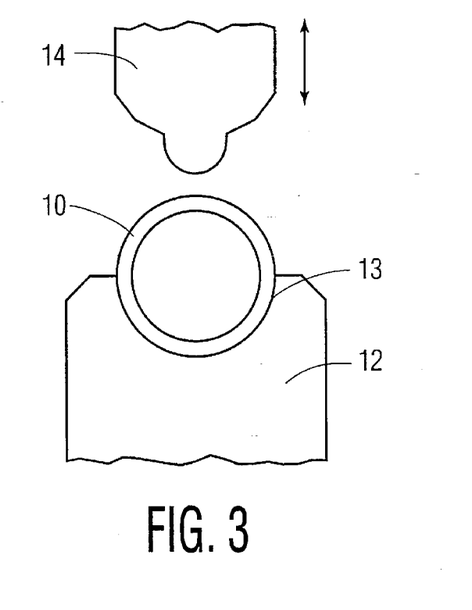
FIGS. 3 and 4 show the tube of FIG. 2 and a pair of fusing electrodes according to the present invention.
Figure 4:
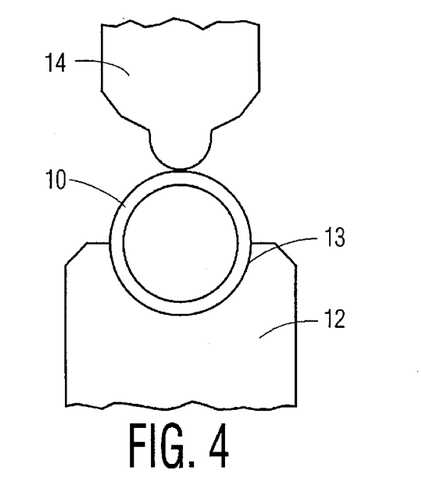
Figure 5:
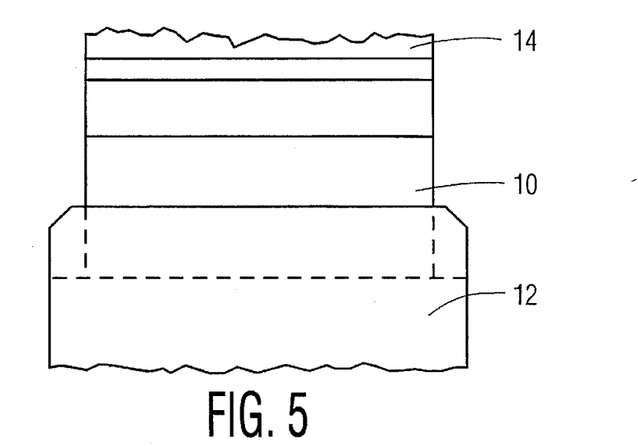
FIG. 5 is a side view of FIG. 4.

With reference to FIGS. 3–5, the method according to the present invention includes the use of a pair of fusing electrodes 12 and 14. Unlike low resistance welding electrodes, electrodes 12 and 14 comprise high resistance electrodes, typically made of tungsten or other suitable material, and serve to apply to the work high pressure, high heat, and some current as further described below. Electrodes 12 and 14 are mounted for movement toward and away from each other. In the illustrated embodiment, electrode 12 is stationary and electrode 14 is mounted for vertical movement. However, if preferred, both electrodes can be mounted for movement, and/or the electrodes can be mounted for relative horizontal movement.

Electrode 12 has a fusing face that forms a cavity 13 for receiving tube 10 generally as shown in FIGS. 3–5 and functions apply fusing pressure, heat and current throughout the bottom half of tube 10. Also, the cavity functions to confine the flow and expansion of tube 10 and wires therein, as described below, which enables increased pressure to be applied to the work assembly. In the illustrated embodiment, the cavity 13 is generally semicircular with approximately the same diameter as the outer diameter of tube 10 and extends to approximately half the vertical diameter of tube 10 when the latter is placed therein.

The fusing face of electrode 14 includes a central projection 17 shaped to extend toward cavity 13. Projection 17 functions to compress the side of tube 10 and the wires therein toward cavity 13 with a greatest pressure being applied toward the center region of the work assembly. Beveled edges 19 extend from projection 17 and cooperate to apply pressure, heat, and current to the outer parts of the work assembly during the fusing.

Figure 6:
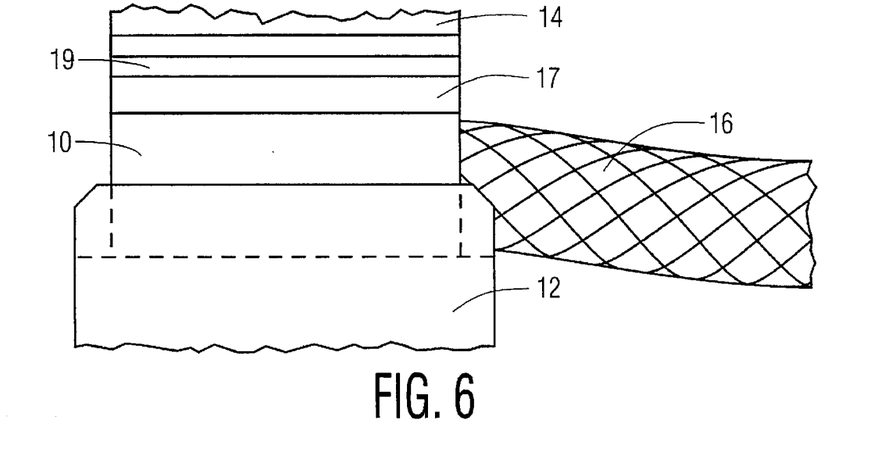
FIGS. 6 and 7 are side and rear views respectfully of the tube held by the electrodes with the insulated wires inserted into the tube member.
Figure 7:
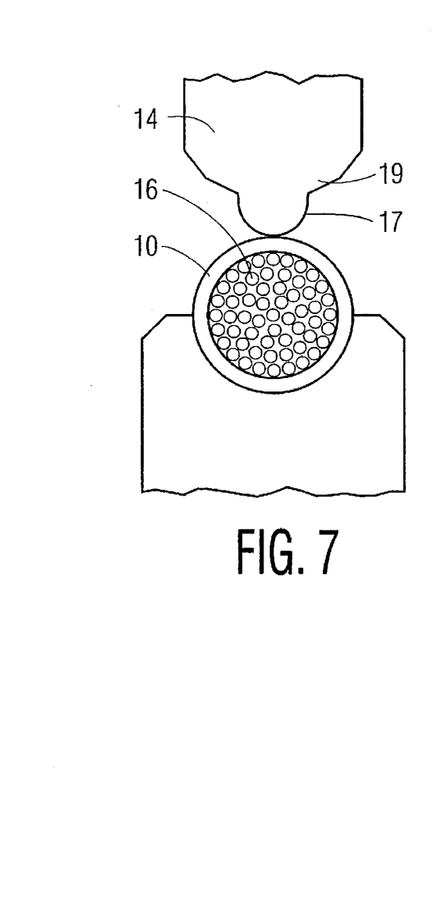

After tube 10 is placed in cavity 13, the operator advances electrode 14 to engage tube 10 with a slight force of about five pounds. Electrode 14 thus serves to hold tube 10 in place while the insulated wires 16 are inserted into tube 10. See FIGS. 6 and 7. The operator can then inspect the work assembly to see if all elements are properly positioned and are free from defects. If for any reason, the work assembly elements are not in the proper position for fusing, the operator can remove wires 16, back off electrode 14 and reposition tube 10, if necessary.

Figure 8:
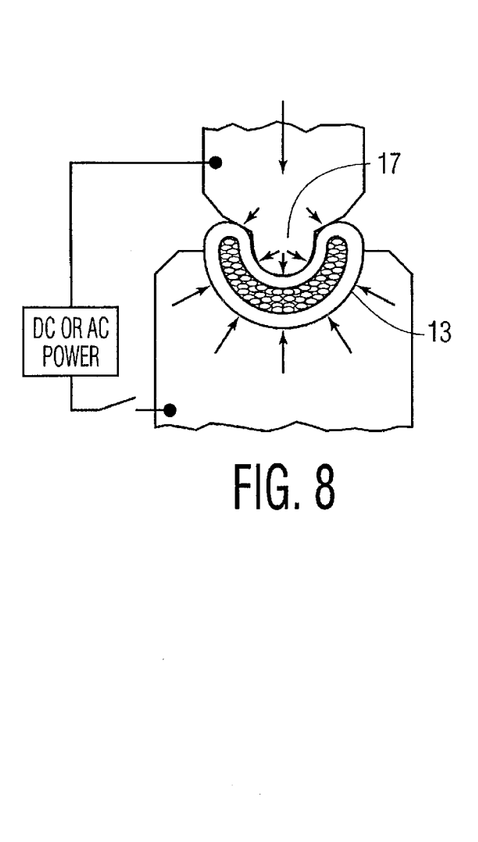
FIG. 8 is a diagramatic view showing the electrode and tube/wire assembly of FIG. 7 during the application of electrode pressure but before the application of electrical power.
Figure 9:
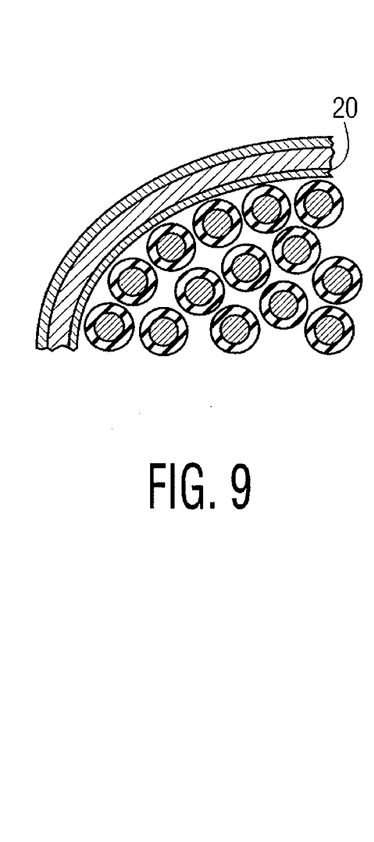
FIG. 9 is a partial exploded view of a part of the tube and insulated wires of FIG. 8.
Figure 10:
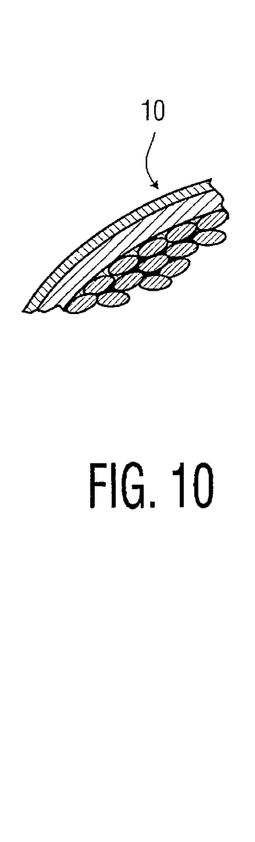
FIG. 10 is similar to FIG. 9 but after the application of heat and electrical power.

Once the operator is satisfied, the operator energizes the fusing actuator switch. Accordingly, fusing head 14 is driven toward electrode 12, generally as shown in FIG. 8. Pressure increases on the work assembly driving all parts together in a reduced volume of space. Fusing current and heat are preferably not applied during the first 25–45 milliseconds, during which tube 10 is greatly deformed and much of the air space between parts is eliminated. As seen in FIG. 8, the pressure applied by electrode cavity 13 is applied to the bottom outer half surface of tube 10 and is directed toward the original axis of tube 10. The pressure applied by projection 17 is applied to the central region of upper outer half surface of tube 10 and is directed in opposition to the direction of the pressure applied by cavity 13. Bevel edges 19 apply pressure near the outer regions of outer half upper surface of tube 10. These pressures are generally indicated by the arrows of FIG. 8.

Once a predetermined pressure or displacement is reached between electrodes 12 and 14, fusing power in the form of AC current is applied through electrode 14 initially through tube 10 only, through electrode 12 to ground. Electrodes 12 and 14 heat to about 1900 degrees F. Because of the shape of tube 10 and the shapes for the electrodes, fusing current flows from electrode 14 evenly through both side cylinder portions of deformed tube 10 to electrode 12. Thus current and heat is applied evenly throughout the length for the work assembly to enhance the integrity and reliability of the finished joint.

Figure 11:
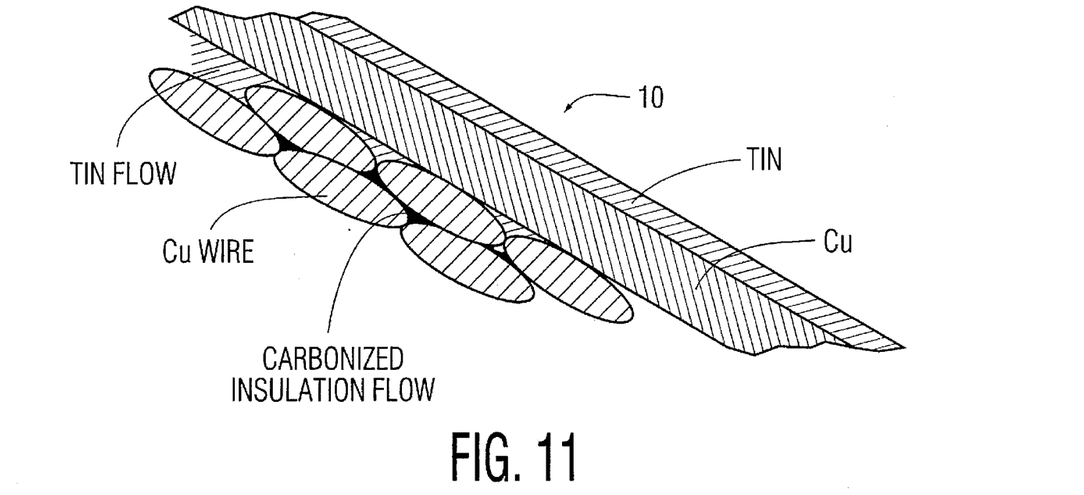
FIG. 11 is an enlarged view of FIG. 10.

Accordingly, the great heat applied to the work assembly vaporizes much of the insulation about wires 16 and causes any remaining insulation to flow away from the heat sources toward the free ends of deformed tube 10 and/or toward any remaining microspaces between parts. During this time, current also begins to flow through the copper wires 16 as the insulation burns off to expose the copper which is still under pressure and forced and deformed against other exposed copper wires and the inside of tube 10. Also, application of fusing heat and current through tube 10 causes the inside tin coating 20 to wet some of the exposed copper wires and to flow toward open microspaces between the deformed wires that become forced together. See FIG. 11. It should be understood that none of the parts amalgamate nor become liquid during the fusing process. The materials only soften and yield to pressure to deform against each other creating a mechanical bond or compression joint between parts. For further information about the use of tin in fusing systems, see JOINING COPPER CONDUCTORS USING TIN-FUSING by S. Karpel, QUARTERLY JOURNAL OF THE INT. TIN RESEARCH INSTITUTE, No. 145, 1985.

Figure 12:
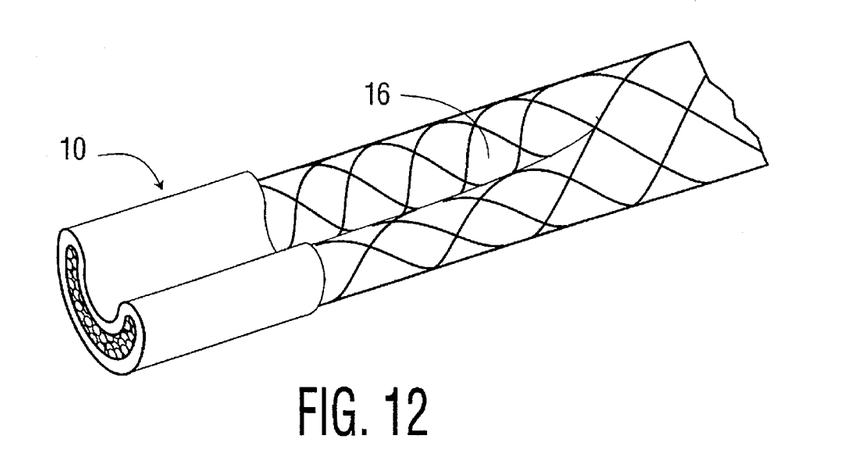
FIG. 12 is a perspective of a terminated tube and wire assembly made pursuant to the above described method.

FIG. 12 shows that final termination for a preferred embodiment illustrated in the previous Figures. The terminal 10 comprises an elongated bow-shaped termination for a plurality of previously insulated wires with great mechanical integrity.

Figure 13:
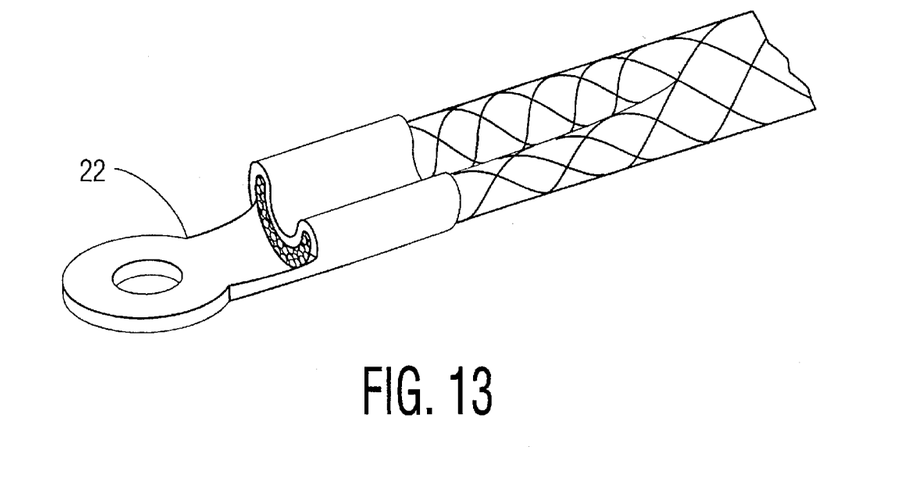
FIG. 13 is similar to FIG. 12 and shows an alternate form of tube termination.

FIG. 13 shows another preferred embodiment in which the terminal includes a terminal connector 22 extending from the tubular termination.

Figure 14:
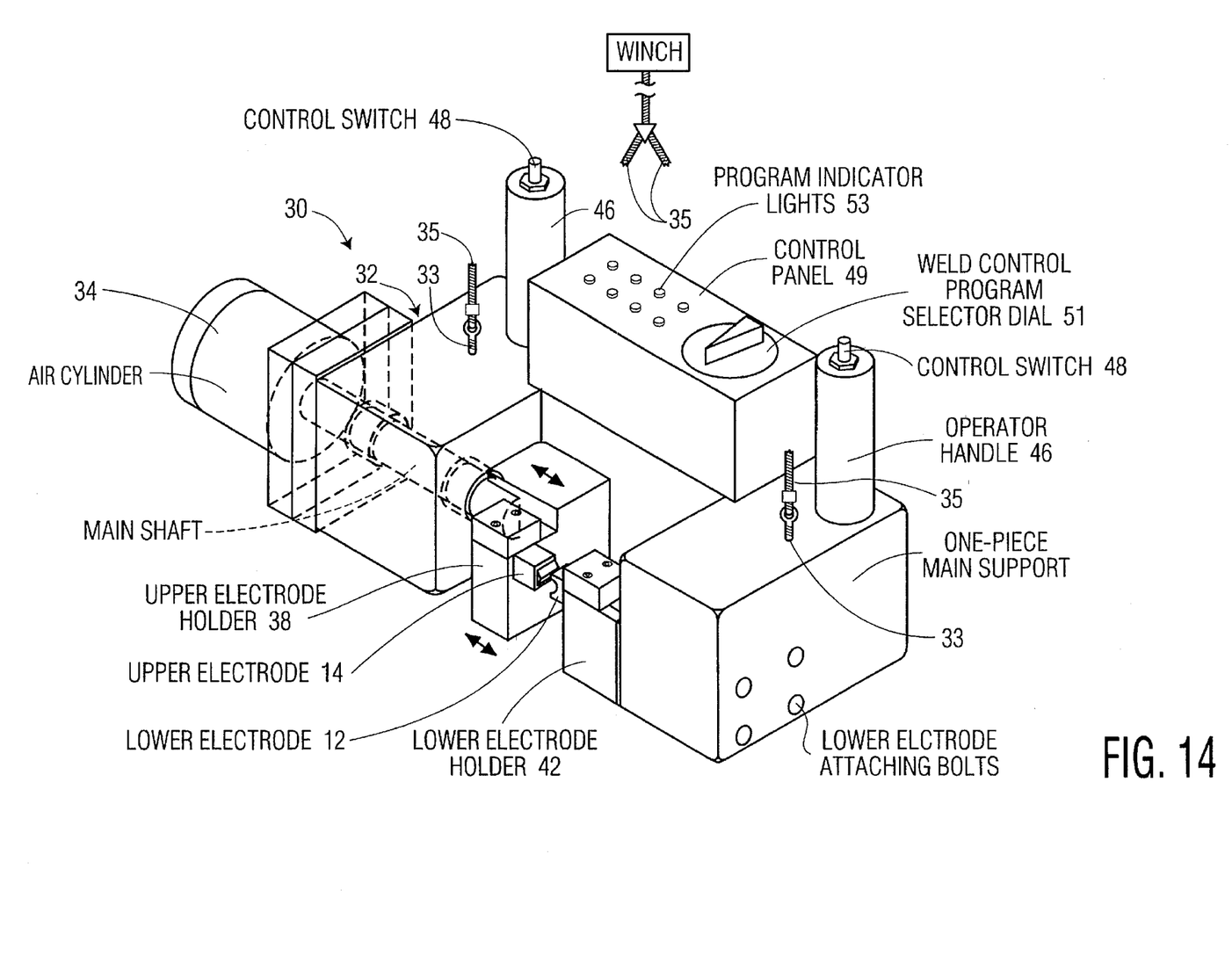
FIG. 14 is a perspective view of one example of a machine for implementing the method described herein.
Figure 15:
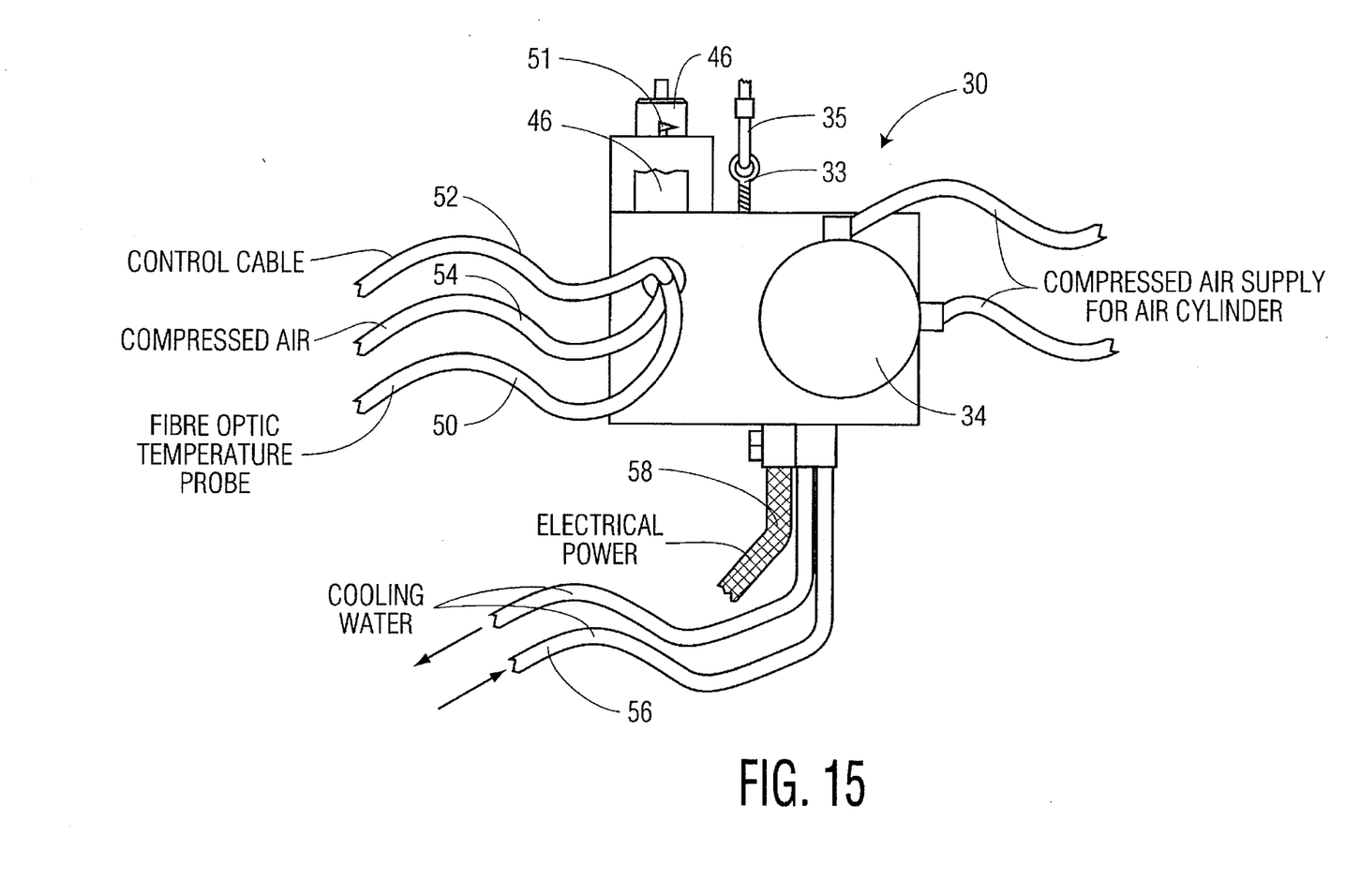
FIG. 15 is a left side view of the machine of FIG. 14.

With reference to FIGS. 14–15, one embodiment of a machine for carrying out the method of the present invention is shown, which machine is portable and has many applications including but not limited to fusing the ends of stator wires for large electric motors. As commonly known, large motors are difficult to move around and the common practice of terminating stator wires therefor includes using mechanical cold crimping apparatus. But this technique does not produce good and long term reliable joints as described above.

The fusing machine 30 of FIG. 14 and 15 includes a single block U-shaped frame 32 made of aluminum or other suitable material, air cylinder 34 mounted on and main shaft 36 mounted through frame 32. Frame 32 suspends in free space from eye-pins 33 and cables 35 that extend to a standard overhead mounted retractable winch. This arrangement enables the operator to move fusing machine 30 in free space to precisely position the fusing electrodes relative to the work to be fused, eg the grouped ends of stator wires.

Upper electrode holder 38 is mounted to the free end of shaft 36 and carries the upper electrode, such as that depicted as 14 in the previous Figures. Fusing machine 30 further includes a lower electrode holder 42 mounted to the inside of frame 32 and carrying the lower electrode such as that depicted as 12 in the previous Figures. Although the lower electrode holder 42 is stationary with frame 32 in the embodiment illustrated, it will be understood that an air cylinder and shaft can be included to drive holder 42 toward electrode holder 38, if desired.

Two operator control handles 46 are mounted on the top and spaced on opposite sides of frame 32. Each handle 46 includes a control switch 48. A control panel 49 is arranged on the top center of frame 32 and includes a selector switch 51 for enabling the operator to select one of eight different fusing current settings depending upon the number of wires, diameter and thickness of tube 10, the nature of the insulation on the wires, and other parameters. The program switch setting is indicated by one of the eight LEDs, lamps or digital display 53.

Frame 32 includes a number of cavities (not shown) to accommodate optic fiber cable 50, electric control cable 52 for control panel 49, air evacuation tube 54 and coolant flow 56. See U.S. Pat. No. 4,079,225 for the use of fiber optic cable to sense the fusing temperature and the work during fusing and controlling the fusing current in response thereto. Air tube communicates with nozzle 55 to draw off fumes from the work/electrode location during the fusing process. Electric power is applied to machine 30 by braided cable 58 connected to the power terminal 59.

In operation, the operator places a tube 10 in the cavity of electrode 12 and presses one of the control switches 48. This causes air cylinder 34 to move electrode holder 38 toward electrode holder 42 until electrode 14 engages tube 10 with a predetermined pressure, such as a few ounces. The operator then moves machine 30 to a position in which the retained tube 10 is near the wires to be terminated. The operator inserts the wires as described above and checks for proper positioning. When satisfied, the operator must place both hands on both handles 46 and throw both actuating switches 48 at the same time in order to apply fusing pressure and power to the work assembly as described above. Once the method described above is completed, the air cylinder will automatically withdraw holder 38 away from the completed terminal. The operator can now move the machine to a new work location and repeat the process.

Figure 16:
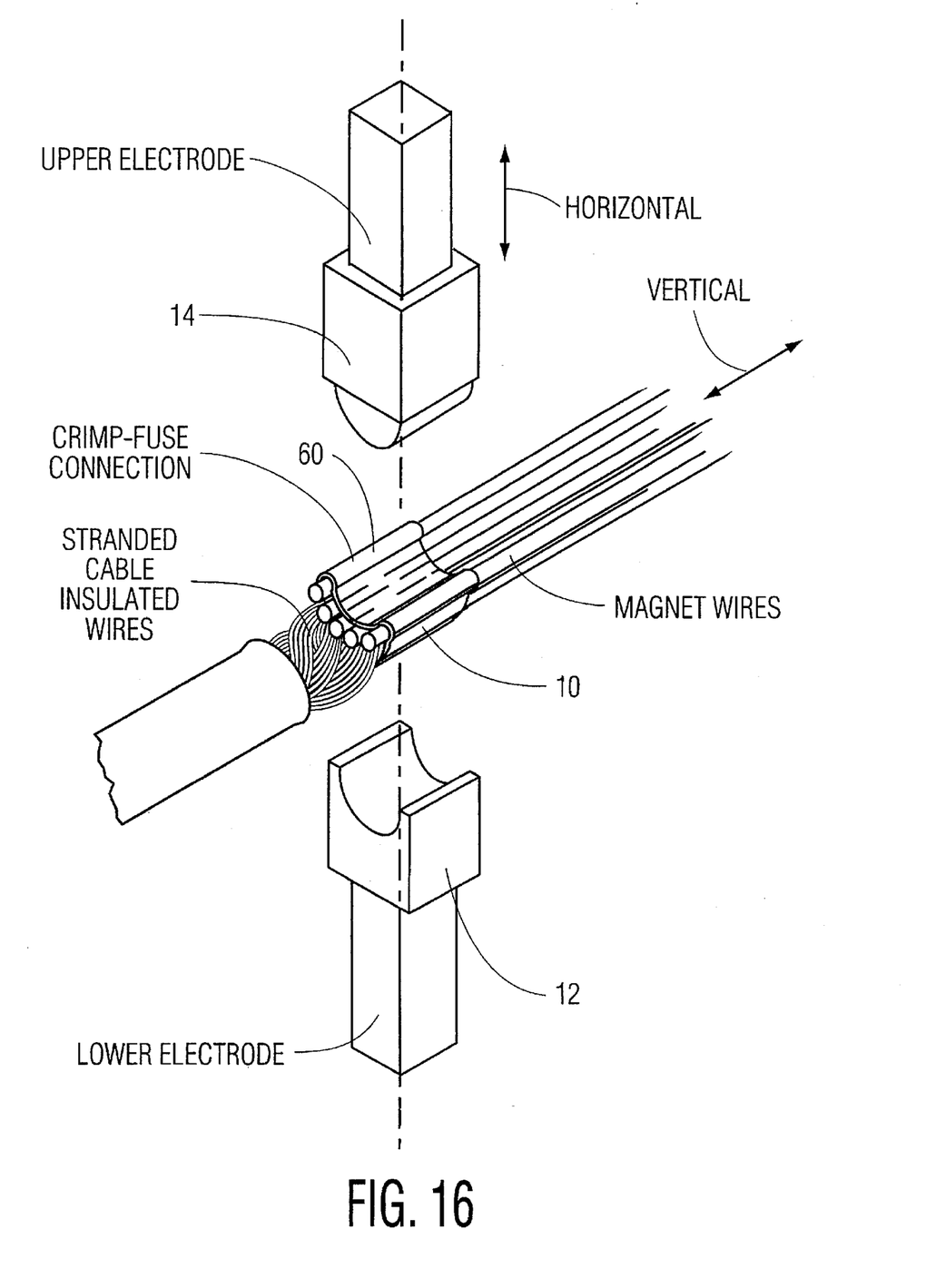
FIGS. 16 is a perspective view of an alternate electrode shape and insulated cable wires joined to insulated magnet wires in accordance with a termination and process of the present invention.

Although the electrodes shown in FIG. 14 are oriented to receive the tube and wire assembly arranged horizontally, it should be understood that the electrodes can be oriented to receive the work assembly in a vertical orientation such as that shown in FIG. 16. With this electrode orientation, wires can be inserted both from the top and bottom of the tube simultaneously. The wires can be of the same type or different types such as the cable wires and magnet wires shown in FIG. 16.

Figure 17:
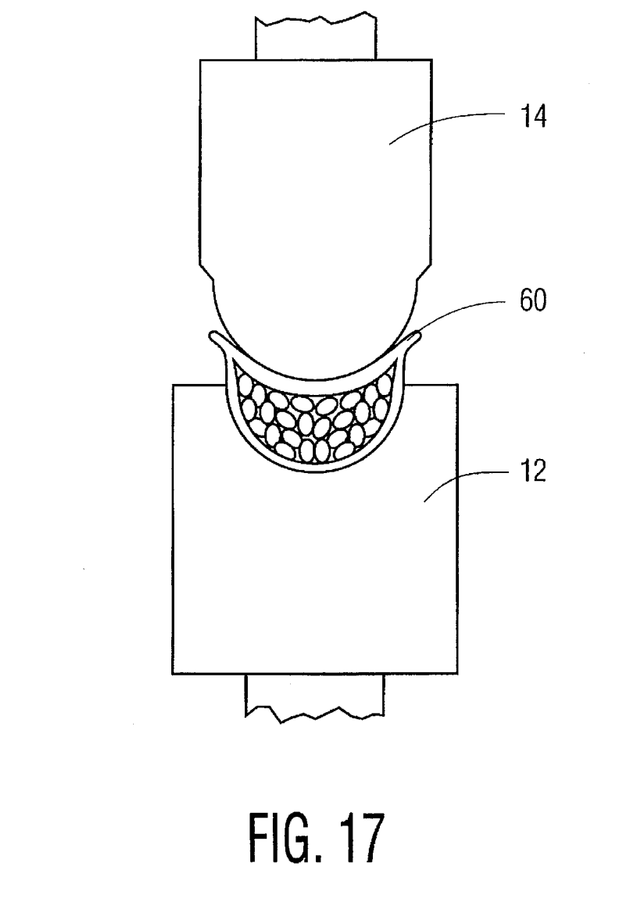
FIG. 17 is a diagrammatic front view of the electrodes, tube and wires of FIG. 16 showing the electrode and tube/wire assembly during application of fusing pressure and prior to application of fusing current.

With reference to FIGS. 16 and 17, the electrodes are shaped to form terminal 10 to include a depressed center region and a pair of wing 60 portions on either side of the depressed center region. The vertical dimension of the electrodes 12 and 14 are preferably generally equal to the length of tube 10 to impart the greatest heat to the work. However, the electrode length may be somewhat shorter than the length of tube 10 with the understanding that fusing energy levels may need to be increased to compensate for the heat sink effect created by the non-fused portions of the tube.

Figure 18:
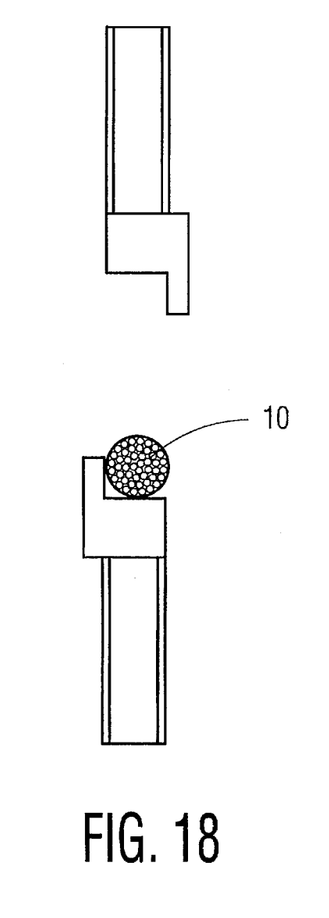
FIG. 18 is similar to FIG. 3 showing alternate electrodes shaped to produce a generally rectangular final tube assembly.
Figure 19:
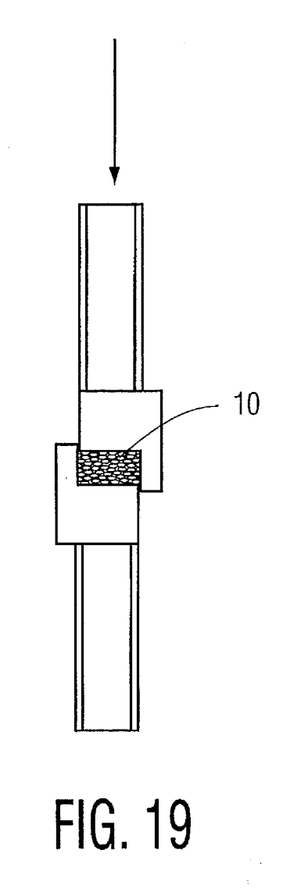
FIG. 19 shows the electrodes and wire/tube assembly of FIG. 19 under fusing pressure in which the tube/wire assembly is deformed into a generally rectangular shape.

It should be understood that a wide variety of electrode shapes may be used in the present invention depending upon the desired final shape of the termination, nature of the wires to be terminated, and other design considerations. For example, the electrodes of FIGS. 18 and 19 are designed to produce a generally rectangular cross section in the final termination.

It will be understood that the fusing machine, method and terminal product according to the present invention provide many advantages over those of the prior art. Also, it will be understood that other and further modifications and changes can be made to the embodiments herein disclosed without departing from the spirit and scope of the present invention.

We claim:

1. In combination for use in joining at least two insulated metal wires, a metal tubular member having continuous outer and inner surfaces, at least two insulated metal wires within said tubular member, a fusing machine comprising, a frame, first and second fusing electrodes, said first and second electrodes being mounted on said frame for movement of at least one of said first and second electrodes toward and away from the other along a first axis, said first electrode comprising a first surface for engaging only a first part of the tubular member with the axis of said tubular member extending generally perpendicular to said first axis, said second electrode comprising a second surface for engaging only a second part of the tubular member, said first and second parts of the tubular member being portions of said continuous outer surface, moving means for moving at least one of said first and second electrodes toward the other to compress the tubular member between said first and second surfaces and to apply fusing pressure to deform the tubular member and compress the wires within said tubular member whereby each of the insulated wires are compressed only against other insulated wires or other insulated wires and said inner surface, and electrical power means for applying current to the fusing electrodes so that the first and second electrodes apply fusing heat and current to the deformed tubular member to burn away wire insulation and soften the wire and tubular metals.

2. The combination according to claim 1, wherein said first and second surfaces are shaped so that the initial fusing current flows from one of said first and second electrodes to the other equally through two symmetrical parts of the tubular member.

3. A combination according to claim 2 wherein said tubular member is at least in part a cylinder and said first and second parts are portions of said cylinder.

4. A combination according to claim 2 wherein said first and second surfaces are shaped to apply fusing pressure on substantially all of the outer surface of the tubular member when deformed to its final shape.

5. A combination according to claim 2, wherein said first and second surfaces are shaped to deform the tube into a rectangular profile.

6. A combination according to claim 2 wherein said first surface comprises a cavity and said second surface comprises a projection extending toward said cavity.

7. A combination according to claim 6 wherein said cavity and said projection have congruous shapes.

8. A combination according to claim 7 wherein said projection presses at least a part of said tubular member into the profile of another part of the tubular member.

9. A combination according to claim 1 further comprising a winch apparatus, a winch cable coupled to and operable by said winch apparatus, and wherein said frame is suspended from said winch cable to enable an operator to selectively position the electrodes in free space.

10. A combination according to claim 9, wherein two switches are mounted on said frame and spaced from each other and on opposite transverse sides of the location of the first and second electrodes for actuating said electrodes to apply slight holding pressure to the tube when one of said switches is actuated and to initiate fusing pressure and current application to said electrodes when both switches are simultaneously operated.

11. A combination according to claim 1 wherein said moving means comprises means for moving said first and second electrodes to engage said tube member with slight pressure prior to moving at least one of said first and second electrodes to apply fusing pressure to said tube member and prior to the insertion of the insulated wires into the tube member to hold the tube fixed in space without deforming said tube member and maintaining the slight pressure until said moving means applies greater pressure toward the magnitude of the fusing pressure.

* * * * *